(12) United States Patent
Anthony et al.

(10) Patent No.: US 8,024,335 B2
(45) Date of Patent: Sep. 20, 2011

(54) SYSTEM AND METHOD FOR DYNAMICALLY GENERATING A SELECTABLE SEARCH EXTENSION

(75) Inventors: Colin R. Anthony, Bothell, WA (US); Richard M. Banks, Egham (GB); Marieke I. Watson, Seattle, WA (US); Cornelis K. Van Dok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 10/887,085

(22) Filed: Jul. 9, 2004

(65) Prior Publication Data
US 2006/0004739 A1  Jan. 5, 2006

Related U.S. Application Data

(60) Provisional application No. 60/566,947, filed on May 3, 2004.

(51) Int. Cl.
*G06F 7/00* (2006.01)
(52) U.S. Cl. ............................ 707/729; 707/765; 715/809
(58) Field of Classification Search .................. 707/722, 707/729, 765; 715/809
See application file for complete search history.

(56) References Cited

U.S. PATENT DOCUMENTS

| | | | |
|---|---|---|---|
| 4,214,141 A * | 7/1980 | Okuda et al. ................ | 219/73 |
| 4,438,505 A | 3/1984 | Yanagiuchi et al. | |
| 4,829,423 A | 5/1989 | Tennant et al. | |
| 4,881,179 A | 11/1989 | Vincent | |
| 4,931,935 A | 6/1990 | Ohira et al. | |
| 5,060,135 A | 10/1991 | Levine | |

(Continued)

FOREIGN PATENT DOCUMENTS
CN  1421800  11/2001
(Continued)

OTHER PUBLICATIONS

Andy Rathbone, "Windows XP for Dummies", Hungry Minds, Inc., New York, NY, Copyright 2001, pp. 106-113.*

(Continued)

*Primary Examiner* — John R. Cottingham
*Assistant Examiner* — Nirav Khakhar
(74) *Attorney, Agent, or Firm* — Shook, Hardy & Bacon L.L.P.

(57) ABSTRACT

A system and related techniques accept user-inputted search terms, for example to perform a search for files or other data or objects. Corresponding matches to those terms may be presented to the user in a "word-wheel"-type breakout list generated on the fly for groupings of hits by attributes or other criteria, as the system searches through the file system at the current level or point in the file system hierarchy. According to embodiments, when the search logic fails to locate a hit on the inputted search term at the current level or point in the file system hierarchy, an extension of the search to different levels or points in the file system hierarchy may be automatically generated, and for instance presented to the user as a selectable search box. That box may for example be highlighted to the user for easy selection. When the user does select the selectable search box, the user's search, for instance for files of type or extension ".doc" or ".memo", may be seamlessly extended to other files, folders, trees or other points or levels in the file system hierarchy. Search results may be continuously or dynamically updated as the user, for example, enters more characters or other data.

23 Claims, 4 Drawing Sheets

U.S. PATENT DOCUMENTS

| | | | |
|---|---|---|---|
| 5,241,671 A | 8/1993 | Reed et al. | |
| 5,297,250 A | 3/1994 | Leroy | |
| 5,327,529 A | 7/1994 | Fults | |
| 5,333,266 A | 7/1994 | Boaz | |
| 5,333,315 A | 7/1994 | Saether et al. | |
| 5,388,196 A | 2/1995 | Pajak et al. | |
| 5,418,946 A | 5/1995 | Mori et al. | |
| 5,420,605 A | 5/1995 | Vouri | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |
| 5,596,702 A | 1/1997 | Stucka | |
| 5,598,524 A | 1/1997 | Johnston, Jr. et al. | |
| 5,600,778 A | 2/1997 | Swanson et al. | |
| 5,606,669 A | 2/1997 | Bertin et al. | |
| 5,625,783 A | 4/1997 | Ezekiel | |
| 5,630,042 A | 5/1997 | McIntosh et al. | |
| 5,648,795 A | 7/1997 | Vouri | |
| 5,652,876 A | 7/1997 | Ashe | |
| 5,675,520 A | 10/1997 | Pitt, III | |
| 5,675,663 A * | 10/1997 | Koerner et al. | 382/181 |
| 5,680,563 A | 10/1997 | Edelman | |
| 5,696,486 A | 12/1997 | Poliquin et al. | |
| 5,696,914 A | 12/1997 | Nahaboo | |
| 5,710,926 A | 1/1998 | Maurer | |
| 5,721,908 A | 2/1998 | Lagarde et al. | |
| 5,757,925 A | 5/1998 | Faybishenko | |
| 5,760,770 A | 6/1998 | Bliss | |
| 5,790,121 A * | 8/1998 | Sklar et al. | 715/853 |
| 5,802,516 A | 9/1998 | Shwarts et al. | |
| 5,828,376 A | 10/1998 | Solimene et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,855,446 A | 1/1999 | Disborg | |
| 5,864,844 A | 1/1999 | James et al. | |
| 5,867,163 A | 2/1999 | Kurtenbach | |
| 5,870,088 A | 2/1999 | Washington | |
| 5,875,446 A | 2/1999 | Brown et al. | |
| 5,875,448 A | 2/1999 | Boys | |
| 5,878,410 A | 3/1999 | Zbikowski et al. | |
| 5,886,694 A | 3/1999 | Breinberg | |
| 5,899,995 A | 5/1999 | Millier et al. | |
| 5,905,973 A | 5/1999 | Yonezawa | |
| 5,907,703 A | 5/1999 | Kronenberg | |
| 5,907,837 A | 5/1999 | Ferrel | |
| 5,909,540 A | 6/1999 | Carter et al. | |
| 5,917,492 A | 6/1999 | Bereiter et al. | |
| 5,923,328 A | 7/1999 | Griesmer | |
| 5,924,090 A | 7/1999 | Krellenstein | |
| 5,929,854 A | 7/1999 | Ross | |
| 5,930,801 A | 7/1999 | Falkenhainer | |
| 5,933,139 A * | 8/1999 | Feigner et al. | 715/708 |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote et al. | |
| 6,023,708 A | 2/2000 | Mendez et al. | |
| 6,024,843 A | 2/2000 | Anderson | |
| 6,025,843 A | 2/2000 | Sklar | |
| 6,037,944 A | 3/2000 | Hugh | |
| 6,055,540 A | 4/2000 | Snow | |
| 6,055,543 A | 4/2000 | Christensen et al. | |
| 6,061,059 A | 5/2000 | Taylor | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson | |
| 6,144,968 A | 11/2000 | Zellweger | |
| 6,147,601 A | 11/2000 | Sandelman et al. | |
| 6,160,552 A | 12/2000 | Wilsher | |
| 6,175,364 B1 | 1/2001 | Wong et al. | |
| 6,181,342 B1 | 1/2001 | Niblack | |
| 6,182,068 B1 * | 1/2001 | Culliss | 707/5 |
| 6,195,650 B1 | 2/2001 | Gaither et al. | |
| 6,202,061 B1 | 3/2001 | Khosla et al. | |
| 6,208,985 B1 * | 3/2001 | Krehel | 707/3 |
| 6,216,122 B1 | 4/2001 | Elson | |
| 6,237,004 B1 | 5/2001 | Dodson et al. | |
| 6,237,011 B1 * | 5/2001 | Ferguson et al. | 715/515 |
| 6,240,407 B1 | 5/2001 | Chang et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,247,020 B1 | 6/2001 | Minard | |
| 6,256,031 B1 | 7/2001 | Meijer et al. | |
| 6,268,852 B1 | 7/2001 | Lindhorst et al. | |
| 6,271,846 B1 | 8/2001 | Martinez et al. | |
| 6,275,829 B1 | 8/2001 | Angiulo et al. | |
| 6,279,016 B1 | 8/2001 | De Vorchik et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,324,541 B1 | 11/2001 | L'etraz et al. | |
| 6,324,551 B1 | 11/2001 | Lamping et al. | |
| 6,326,953 B1 | 12/2001 | Wana | |
| 6,330,007 B1 | 12/2001 | Isreal | |
| 6,339,767 B1 | 1/2002 | Rivette et al. | |
| 6,341,280 B1 | 1/2002 | Glass et al. | |
| 6,342,907 B1 | 1/2002 | Petty | |
| 6,356,863 B1 | 3/2002 | Sayle | |
| 6,356,908 B1 | 3/2002 | Brown et al. | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,370,518 B1 * | 4/2002 | Payne et al. | 1/1 |
| 6,377,283 B1 | 4/2002 | Thomas | |
| 6,385,641 B1 | 5/2002 | Jiang et al. | |
| 6,393,429 B1 | 5/2002 | Yagi et al. | |
| 6,401,097 B1 | 6/2002 | McCotter et al. | |
| 6,405,265 B1 | 6/2002 | Kronenberg | |
| 6,408,298 B1 | 6/2002 | Van | |
| 6,411,311 B1 | 6/2002 | Rich et al. | |
| 6,425,120 B1 | 7/2002 | Morganelli et al. | |
| 6,425,121 B1 | 7/2002 | Phillips | |
| 6,430,575 B1 | 8/2002 | Dourish et al. | |
| 6,437,807 B1 | 8/2002 | Berquist et al. | |
| 6,438,590 B1 | 8/2002 | Gartner | |
| 6,448,985 B1 | 9/2002 | McNally | |
| 6,453,311 B1 | 9/2002 | Powers, III | |
| 6,453,319 B1 | 9/2002 | Mattis et al. | |
| 6,613,101 B2 | 9/2002 | Mander et al. | |
| 6,462,762 B1 | 10/2002 | Ku | |
| 6,466,228 B1 | 10/2002 | Ulrich | |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,430,835 B1 | 11/2002 | Light | |
| 6,480,835 B1 | 11/2002 | Light | |
| 6,483,525 B1 | 11/2002 | Tange | |
| 6,484,205 B1 | 11/2002 | Byford | |
| 6,505,233 B1 | 1/2003 | Hanson et al. | |
| 6,513,038 B1 | 1/2003 | Hasegawa et al. | |
| 6,519,612 B1 | 2/2003 | Howard et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,544,295 B1 | 4/2003 | Bodnar | |

| Patent | Date | Inventor |
|---|---|---|
| 6,549,217 B1 | 4/2003 | De Greef et al. |
| 6,549,916 B1 | 4/2003 | Sedlar |
| 6,563,514 B1 | 5/2003 | Samar |
| 6,571,245 B2 | 5/2003 | Huang et al. |
| 7,191,195 B2 | 5/2003 | Koyama et al. |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,611 B2 * | 6/2004 | Krupin et al. ............. 707/3 |
| 6,751,626 B2 | 6/2004 | Brown et al. |
| 6,754,829 B1 | 6/2004 | Butt et al. |
| 6,760,721 B1 | 7/2004 | Chasen et al. |
| 6,760,722 B1 * | 7/2004 | Raghunandan ............ 707/3 |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,810,404 B1 | 10/2004 | Ferguson et al. |
| 6,813,474 B2 | 11/2004 | Robinson et al. |
| 6,816,863 B2 | 11/2004 | Bates et al. |
| 6,816,868 B1 | 11/2004 | Shimizu |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,885,860 B2 | 4/2005 | Bahl |
| 6,906,722 B2 | 6/2005 | Hrebejk et al. |
| 6,910,049 B2 | 6/2005 | Fenton et al. |
| 6,922,709 B2 | 7/2005 | Goodman |
| 7,650,575 B2 | 7/2005 | Cummins |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,948,120 B1 | 9/2005 | Delgobbo |
| 6,950,818 B2 | 9/2005 | Dennis et al. |
| 6,950,989 B2 | 9/2005 | Rosenzweig |
| 6,952,714 B2 | 10/2005 | Peart |
| 6,952,724 B2 | 10/2005 | Prust |
| 6,980,993 B2 | 12/2005 | Horvitz et al. |
| 6,983,424 B1 | 1/2006 | Dutta |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,512,586 B2 | 4/2006 | Kaasten et al. |
| 7,043,472 B2 | 5/2006 | Aridor et al. |
| 7,047,498 B2 | 5/2006 | Lui |
| 7,051,291 B2 | 5/2006 | Sciammarella et al. |
| 7,162,466 B2 | 5/2006 | Kaasten et al. |
| 7,058,891 B2 | 6/2006 | O'Neal et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,168,051 B2 | 1/2007 | Robinson et al. |
| 7,194,743 B2 | 3/2007 | Hayton |
| 7,203,948 B2 | 4/2007 | Mukundan et al. |
| 7,216,289 B2 | 5/2007 | Kagle |
| 7,216,301 B2 | 5/2007 | Moehrle |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,278,106 B1 | 10/2007 | Mason |
| 7,290,245 B2 | 10/2007 | Skjolsvold |
| 7,293,031 B1 | 11/2007 | Dusker et al. |
| 7,383,494 B2 | 6/2008 | Krolczyk et al. |
| 7,409,382 B2 | 8/2008 | Kido |
| 7,409,644 B2 | 8/2008 | Moore et al. |
| 7,415,484 B1 | 8/2008 | Tulkoff et al. |
| 7,484,183 B2 | 1/2009 | Look et al. |
| 7,499,925 B2 | 3/2009 | Moore et al. |
| 7,526,483 B2 | 4/2009 | Samji et al. |
| 7,536,386 B2 | 5/2009 | Samji et al. |
| 7,536,410 B2 | 5/2009 | Wong |
| 7,587,411 B2 | 9/2009 | De Vorchik |
| 7,614,016 B2 | 11/2009 | Wong |
| 7,627,552 B2 | 12/2009 | Moore et al. |
| 7,853,890 B2 | 12/2010 | Miner et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0021828 A1 | 2/2002 | Papier |
| 2002/0033844 A1 | 3/2002 | Levy et al. |
| 2002/0046209 A1 | 4/2002 | De Bellis |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0049777 A1 | 4/2002 | Terayama et al. |
| 2002/0052885 A1 | 5/2002 | Levy |
| 2002/0054167 A1 | 5/2002 | Hugh |
| 2002/0059199 A1 | 5/2002 | Harvey |
| 2002/0059288 A1 | 5/2002 | Yagi |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0078035 A1 * | 6/2002 | Frank et al. ............... 707/3 |
| 2002/0087652 A1 | 7/2002 | Davis et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos |
| 2002/0103998 A1 | 8/2002 | DeBruine |
| 2002/0104069 A1 | 8/2002 | Gouge et al. |
| 2002/0105548 A1 | 8/2002 | Hayton |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120604 A1 | 8/2002 | Labarge |
| 2002/0120757 A1 | 8/2002 | Sutherland et al. |
| 2002/0120505 A1 | 9/2002 | Henkin et al. |
| 2002/0129033 A1 | 9/2002 | Hoxie et al. |

| | | | | | |
|---|---|---|---|---|---|
| 2002/0138552 A1 | 9/2002 | DeBruine et al. | 2003/0225796 A1 | 12/2003 | Matsubara |
| 2002/0138582 A1 | 9/2002 | Chandra et al. | 2003/0227480 A1 | 12/2003 | Polk |
| 2002/0138744 A1 | 9/2002 | Schleicher et al. | 2003/0227487 A1 | 12/2003 | Hugh |
| 2002/0144155 A1 | 10/2002 | Bate | 2003/0233419 A1 | 12/2003 | Beringer |
| 2002/0149888 A1 | 10/2002 | Motonishi | 2004/0001106 A1 | 1/2004 | Deutscher et al. |
| 2002/0152262 A1 | 10/2002 | Arkin et al. | 2004/0002993 A1 | 1/2004 | Toussaint et al. |
| 2002/0152267 A1 | 10/2002 | Lennon | 2004/0003247 A1 | 1/2004 | Fraser et al. |
| 2002/0156756 A1 | 10/2002 | Stanley | 2004/0004638 A1 | 1/2004 | Babaria |
| 2002/0156895 A1 | 10/2002 | Brown | 2004/0006549 A1 | 1/2004 | Mullins |
| 2002/0161800 A1 | 10/2002 | Eld et al. | 2004/0008226 A1 | 1/2004 | Manolis et al. |
| 2002/0163572 A1 | 11/2002 | Center et al. | 2004/0019584 A1 | 1/2004 | Greening et al. |
| 2002/0169678 A1 | 11/2002 | Chao et al. | 2004/0019655 A1 | 1/2004 | Uemura et al. |
| 2002/0174329 A1 | 11/2002 | Bowler et al. | 2004/0019875 A1 | 1/2004 | Welch |
| 2002/0181398 A1 | 12/2002 | Szlam | 2004/0030731 A1 | 2/2004 | Iftode et al. |
| 2002/0184357 A1 | 12/2002 | Traversat et al. | 2004/0044696 A1 | 3/2004 | Frost |
| 2002/0188605 A1 | 12/2002 | Adya et al. | 2004/0044776 A1 | 3/2004 | Larkin |
| 2002/0188621 A1 | 12/2002 | Flank et al. | 2004/0054674 A1 | 3/2004 | Carpenter et al. |
| 2002/0188735 A1 | 12/2002 | Needham et al. | 2004/0056894 A1 | 3/2004 | Zaika et al. |
| 2002/0194252 A1 | 12/2002 | Powers, III | 2004/0056896 A1 | 3/2004 | Doblmayr et al. |
| 2002/0196276 A1 | 12/2002 | Corl et al. | 2004/0059755 A1 | 3/2004 | Farrington et al. |
| 2002/0199061 A1 | 12/2002 | Friedman et al. | 2004/0068524 A1 | 4/2004 | Aboulhosn et al. |
| 2003/0001964 A1 | 1/2003 | Masukura et al. | 2004/0070612 A1 | 4/2004 | Sinclair et al. |
| 2003/0009484 A1 | 1/2003 | Hamanaka et al. | 2004/0073705 A1 | 4/2004 | Madril |
| 2003/0014415 A1 | 1/2003 | Weiss et al. | 2004/0083433 A1 | 4/2004 | Takeya |
| 2003/0018657 A1 | 1/2003 | Monday | 2004/0085581 A1 | 5/2004 | Tonkin |
| 2003/0018712 A1 | 1/2003 | Harrow et al. | 2004/0088374 A1 | 5/2004 | Webb et al. |
| 2003/0028610 A1 | 2/2003 | Pearson | 2004/0091175 A1 | 5/2004 | Beyrouti |
| 2003/0033367 A1 | 2/2003 | Itoh | 2004/0098370 A1 | 5/2004 | Garland et al. |
| 2003/0037060 A1 | 2/2003 | Kuehnel | 2004/0098379 A1 | 5/2004 | Huang |
| 2003/0041178 A1 | 2/2003 | Brouk et al. | 2004/0098742 A1 | 5/2004 | Hsieh et al. |
| 2003/0046011 A1* | 3/2003 | Friedman ..................... 702/27 | 2004/0103073 A1 | 5/2004 | Blake et al. |
| 2003/0046260 A1 | 3/2003 | Satyanarayanan et al. | 2004/0103280 A1 | 5/2004 | Balfanz et al. |
| 2003/0050927 A1* | 3/2003 | Hussam .......................... 707/5 | 2004/0105127 A1 | 6/2004 | Cudd |
| 2003/0063124 A1 | 4/2003 | Melhem et al. | 2004/0117358 A1 | 6/2004 | von Kaenel et al. |
| 2003/0069893 A1 | 4/2003 | Kanai et al. | 2004/0117405 A1 | 6/2004 | Short |
| 2003/0069908 A1 | 4/2003 | Anthony et al. | 2004/0128322 A1 | 7/2004 | Nagy |
| 2003/0074356 A1 | 4/2003 | Kaler et al. | 2004/0133572 A1 | 7/2004 | Bailey et al. |
| 2003/0076322 A1 | 4/2003 | Ouzts et al. | 2004/0133588 A1 | 7/2004 | Kiessig et al. |
| 2003/0078918 A1 | 4/2003 | Souvignier et al. | 2004/0133845 A1 | 7/2004 | Forstall et al. |
| 2003/0079038 A1 | 4/2003 | Robbin et al. | 2004/0142749 A1 | 7/2004 | Ishimaru et al. |
| 2003/0081002 A1 | 5/2003 | De Vorchik | 2004/0143349 A1 | 7/2004 | Roberts et al. |
| 2003/0081007 A1 | 5/2003 | Cyr et al. | 2004/0148434 A1 | 7/2004 | Matsubara et al. |
| 2003/0084425 A1 | 5/2003 | Glaser | 2004/0153451 A1 | 8/2004 | Phillips et al. |
| 2003/0085918 A1 | 5/2003 | Beaumont et al. | 2004/0153968 A1 | 8/2004 | Ching et al. |
| 2003/0093321 A1 | 5/2003 | Bodmer et al. | 2004/0162838 A1 | 8/2004 | Murayama et al. |
| 2003/0093531 A1 | 5/2003 | Yeung et al. | 2004/0167942 A1 | 8/2004 | Oshinsky et al. |
| 2003/0093580 A1 | 5/2003 | Thomas et al. | 2004/0168118 A1 | 8/2004 | Wong et al. |
| 2003/0097361 A1 | 5/2003 | Huang et al. | 2004/0174396 A1 | 9/2004 | Jobs et al. |
| 2003/0098881 A1 | 5/2003 | Nolte et al. | 2004/0177116 A1 | 9/2004 | McConn et al. |
| 2003/0098893 A1 | 5/2003 | Makinen | 2004/0177148 A1 | 9/2004 | Tsimelzon, Jr. |
| 2003/0098894 A1 | 5/2003 | Sheldon | 2004/0177319 A1* | 9/2004 | Horn ..................... 715/501.1 |
| 2003/0101200 A1 | 5/2003 | Koyama et al. | 2004/0181516 A1 | 9/2004 | Ellwanger et al. |
| 2003/0105745 A1 | 6/2003 | Davidson et al. | 2004/0183824 A1 | 9/2004 | Benson et al. |
| 2003/0107597 A1 | 6/2003 | Jameson | 2004/0189694 A1 | 9/2004 | Kurtz et al. |
| 2003/0110188 A1 | 6/2003 | Howard et al. | 2004/0189704 A1 | 9/2004 | Walsh et al. |
| 2003/0115218 A1 | 6/2003 | Bobbitt et al. | 2004/0189707 A1 | 9/2004 | Moore et al. |
| 2003/0117403 A1 | 6/2003 | Park et al. | 2004/0193594 A1 | 9/2004 | Moore et al. |
| 2003/0117422 A1 | 6/2003 | Hiyama et al. | 2004/0193599 A1 | 9/2004 | Liu et al. |
| 2003/0120678 A1 | 6/2003 | Hill | 2004/0193600 A1 | 9/2004 | Kaasten et al. |
| 2003/0120928 A1 | 6/2003 | Cato et al. | 2004/0193621 A1 | 9/2004 | Moore et al. |
| 2003/0120952 A1 | 6/2003 | Tarbotton et al. | 2004/0193672 A1 | 9/2004 | Samji et al. |
| 2003/0122873 A1 | 7/2003 | Dieberger et al. | 2004/0193673 A1 | 9/2004 | Samji et al. |
| 2003/0126136 A1 | 7/2003 | Omoigui | 2004/0199507 A1 | 10/2004 | Tawa |
| 2003/0126212 A1 | 7/2003 | Morris et al. | 2004/0205168 A1 | 10/2004 | Asher |
| 2003/0135495 A1 | 7/2003 | Vagnozzi | 2004/0205625 A1 | 10/2004 | Banatwala et al. |
| 2003/0135513 A1 | 7/2003 | Quinn et al. | 2004/0205633 A1 | 10/2004 | Martinez et al. |
| 2003/0135517 A1 | 7/2003 | Kauffman | 2004/0205698 A1 | 10/2004 | Schliesmann et al. |
| 2003/0135659 A1 | 7/2003 | Bellotti et al. | 2004/0215600 A1 | 10/2004 | Aridor et al. |
| 2003/0140115 A1 | 7/2003 | Mehra | 2004/0220899 A1 | 11/2004 | Barney et al. |
| 2003/0154185 A1 | 8/2003 | Suzuki et al. | 2004/0223057 A1 | 11/2004 | Oura et al. |
| 2003/0158855 A1 | 8/2003 | Farnham et al. | 2004/0225650 A1 | 11/2004 | Cooper et al. |
| 2003/0177422 A1 | 9/2003 | Tararoukhine et al. | 2004/0230572 A1 | 11/2004 | Omoigui |
| 2003/0184587 A1 | 10/2003 | Ording et al. | 2004/0230599 A1 | 11/2004 | Moore et al. |
| 2003/0195950 A1 | 10/2003 | Huang et al. | 2004/0230917 A1 | 11/2004 | Bales et al. |
| 2003/0210281 A1 | 11/2003 | Ellis et al. | 2004/0233235 A1 | 11/2004 | Rubin et al. |
| 2003/0212664 A1 | 11/2003 | Breining et al. | 2004/0243597 A1 | 12/2004 | Jensen et al. |
| 2003/0212680 A1 | 11/2003 | Bates et al. | 2004/0249902 A1 | 12/2004 | Tadayon et al. |
| 2003/0212710 A1 | 11/2003 | Guy | 2004/0255048 A1 | 12/2004 | Lev Ran et al. |
| 2003/0222915 A1 | 12/2003 | Marion et al. | 2004/0257169 A1 | 12/2004 | Nelson |

| Publication No. | Date | Name |
|---|---|---|
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0022132 A1 | 1/2005 | Herzberg et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0071355 A1 | 3/2005 | Cameron et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0138567 A1 | 6/2005 | Smith et al. |
| 2005/0149481 A1 | 7/2005 | Hesselink et al. |
| 2005/0165753 A1 | 7/2005 | Chen et al. |
| 2005/0166159 A1 | 7/2005 | Mondry et al. |
| 2005/0166189 A1* | 7/2005 | Ma .................. 717/136 |
| 2005/0171947 A1 | 8/2005 | Gautestad |
| 2005/0188174 A1 | 8/2005 | Guzak |
| 2005/0192953 A1 | 9/2005 | Neale et al. |
| 2005/0192966 A1 | 9/2005 | Hilbert et al. |
| 2005/0207757 A1 | 9/2005 | Okuno |
| 2005/0240880 A1 | 10/2005 | Banks |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246648 A1 | 11/2005 | Miner |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2005/0283742 A1 | 12/2005 | Gusmorino |
| 2006/0004692 A1 | 1/2006 | Kaasten et al. |
| 2006/0004739 A1 | 1/2006 | Anthony et al. |
| 2006/0020586 A1 | 1/2006 | Prompt et al. |
| 2006/0036568 A1 | 2/2006 | Moore et al. |
| 2006/0053066 A1 | 3/2006 | Sherr et al. |
| 2006/0053388 A1 | 3/2006 | Michelman |
| 2006/0059204 A1 | 3/2006 | Borthakur |
| 2006/0080308 A1 | 4/2006 | Carpentier et al. |
| 2006/0090137 A1 | 4/2006 | Cheng et al. |
| 2006/0129627 A1 | 6/2006 | Phillips et al. |
| 2006/0173873 A1 | 8/2006 | Prompt et al. |
| 2006/0200455 A1 | 9/2006 | Wilson |
| 2006/0200466 A1 | 9/2006 | Kaasten et al. |
| 2006/0200832 A1 | 9/2006 | Dutton |
| 2006/0218122 A1 | 9/2006 | Poston et al. |
| 2006/0242122 A1 | 10/2006 | De Vorchik |
| 2006/0242164 A1 | 10/2006 | Evans |
| 2006/0242585 A1 | 10/2006 | Cutsinger |
| 2006/0242591 A1 | 10/2006 | Van Dok |
| 2006/0242604 A1 | 10/2006 | Wong |
| 2006/0277432 A1 | 12/2006 | Patel et al. |
| 2007/0088672 A1 | 4/2007 | Kaasten et al. |
| 2007/0129977 A1* | 6/2007 | Forney .................. 705/7 |
| 2007/0130170 A1* | 6/2007 | Forney .................. 707/100 |
| 2007/0130182 A1* | 6/2007 | Forney .................. 707/101 |
| 2007/0168885 A1 | 7/2007 | Muller et al. |
| 2007/0168886 A1 | 7/2007 | Hally |
| 2007/0180432 A1 | 8/2007 | Gassner et al. |
| 2007/0186183 A1 | 8/2007 | Hudson |
| 2008/0222547 A1 | 9/2008 | Wong |
| 2009/0171983 A1 | 7/2009 | Samji et al. |

FOREIGN PATENT DOCUMENTS

| | | |
|---|---|---|
| EP | 1089196 | 4/2001 |
| EP | 1235137 | 8/2002 |
| GB | 2329492 | 3/1999 |
| JP | 2004362745 | 12/1992 |
| JP | 05-089173 | 9/1993 |
| JP | 07-129448 | 5/1995 |
| JP | 09244940 | 8/1997 |
| JP | 11-212842 | 8/1999 |
| JP | 2000-242655 | 9/2000 |
| JP | 2000348049 | 12/2000 |
| JP | 2001142766 A | 5/2001 |
| JP | 2001154831 A | 6/2001 |
| JP | 2001188702 A | 7/2001 |
| JP | 2001-297022 | 10/2001 |
| JP | 2002099565 A | 4/2002 |
| JP | 2002140216 | 5/2002 |
| JP | 2002182953 A | 6/2002 |
| JP | 2002269145 | 9/2002 |
| JP | 2004133796 | 10/2002 |
| JP | 2002334103 | 11/2002 |
| JP | 2004046870 | 2/2004 |
| RU | 2347258 | 2/2009 |
| WO | 9322738 A1 | 6/1994 |
| WO | 9412944 A1 | 6/1994 |
| WO | 9414281 A1 | 6/1994 |
| WO | 9938092 | 7/1999 |
| WO | 9949663 A1 | 9/1999 |
| WO | 01/63919 A1 | 8/2001 |
| WO | 0157867 | 8/2001 |
| WO | WO 0225420 | 3/2002 |
| WO | WO 2004107151 | 9/2004 |
| WO | 2004097680 A1 | 11/2004 |

OTHER PUBLICATIONS

David Pogue, "Windows XP Home Edition: The Missing Manual", O'Reilly, 2001.*

Written Opinion of Singapore Application No. 200403220-7 dated May 18, 2006.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrators Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghislercom/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Wikipedia, File Allocation Table, 2006, <http://en.wikipedia.org/wiki/File_Allocation_Table>.

Cohen, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35$^{th}$ Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients"Products Description, ©1999-2004 Cerulean Studios, <http://www.ceruleanstudios.com> [retrieved Apr. 30, 2004].
International Search Report of WO2004/097638 A1 (McKee, et al.) dated Nov. 11, 2004.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn"Features from Within Your Application" (CLI 391); downloaded from http://msdn.microsoft.com/longhorn/pdcmaterials/pdctalksavalon/>; date of first publication prior to Mar. 31, 2005; 27 pages.
MessageBox Function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files"; downloaded from <http://msdn.microsoft.com>; date of first publication prior to Feb. 21, 2005; 4 pages.
"About Dialog Boxes"; downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"Propsheetpage"; downloaded from <http://msdn.microsoft.com>; date of first publication prior to Feb. 21, 2005; 3 pages.
"DialogProc Function"; downloaded from <http://msdn.microsoft.com>; date of first publication prior to Feb. 21, 2005; 2 pages.
"Creating Wizards"; downloaded from <http://msdn.microsoft.com>; date of first publication prior to Mar. 31, 2005; 17 pages.
"Property Sheets"; downloaded from <http://msdn.microsoft.com>; date of first publication prior to Mar. 31, 2005; 7 pages.
"Property Sheet Reference"; downloaded from <http://msdn.microsoft.com>; date of first publication prior to Mar. 31, 2005; 5 pages.
"DRAWITEMSTRUCT Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN_QUERYCANCEL Notification"; downloaded from <http://msdn.microsoft.com>; date of first publication prior to Mar. 31, 2005; 1 page.
"PSN_RESET Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.
"PSN_WIZBACK Notification"; downloaded from <http://msdn.microsoft.com>; date of first publication prior to Mar. 31, 2005; 3 pages.
"PSN_WIZFINISH Notification" ; downloaded from <http://msdn.microsoft.com>; date of first publication prior to Mar. 31, 2005; 1 page.
"PSN_WIZNEXT Notification"; downloaded from <http://msdn.microsoft.com>; date of first publication prior to Mar. 31, 2005; 3 pages.
"PSM_ADDPAGE Message"; downloaded from <http://msdn.microsoft.com>; date of first publication prior to Mar. 31, 2005; 2 pages.
"PSM_IDTOINDEX Message"; downloaded from <http://msdn.microsoft.com>; date of first publication prior to Mar. 31, 2005; 1 page.
"PSM_INDEXTOHWND Message"; downloaded from <http://msdn.microsoft.com>; date of first publication prior to Mar. 31, 2005; 1 page.
"PSM_INDEXTOID Message"; downloaded from <http://msdn.microsoft.com>; date of first publication prior to Mar. 31, 2005; 1 page.
"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.
"PSM_PRESSBUTTON Message"; downloaded from <http://msdn.microsoft.com>; date of first publication prior to Mar. 31, 2005; 1 page.
"PSM_QUERYSIBLINGS Message" ; downloaded from <http://msdn.microsoft.com>; date of first publication prior to Mar. 31, 2005; 1 page.
"PSM_SETCURSEL Message"; downloaded from <http://msdn.microsoft.com>; date of first publication prior to Mar. 31, 2005; 1 page.
"PSM_SETCURSELID Message"; downloaded from <http://msdn.microsoft.com>; date of first publication prior to Mar. 31, 2005; 1 page.
"PSM_SETFINISHTEXT Message"; downloaded from <http://msdn.microsoft.com>; date of first publication prior to Mar. 31, 2005; 1 page.
"PSM_SETHEADERTITLE Message"; downloaded from <http://msdn.microsoft.com>; date of first publication prior to Mar. 31, 2005; 1 page.
"PSM_SETWIZBUTTONS Message"; downloaded from <http://msdn.microsoft.com>; date of first publication prior to Mar. 31, 2005; 2 pages.
"PROPSHEETHEADER Structure" ; downloaded from <http://msdn.microsoft.com>; date of first publication prior to Mar. 31, 2005; 5 pages.
"PROPSHEETPAGE Structure"; downloaded from <http://msdn.microsoft.com>; date of first publication prior to Mar. 31, 2005; 4 pages.
"PSHNOTIFY Structure"; downloaded from <http://msdn.microsoft.com>; date of first publication prior to Mar. 31, 2005; 1 page.
"BCM_GETIDEALSIZE Message"; downloaded from <http://msdn.microsoft.com>; date of first publication prior to Mar. 31, 2005; 1 page.
"PSM_SETTITLE Message"; downloaded from <http://msdn.microsoft.com>; date of first publication prior to Mar. 31, 2005; 1 page.
Lee, J., "An End-User Perspective on File-Sharing Systems," Communications of the ACM 46(2):49-53, Feb. 2003.
Ohtani, A., et al., "A File Sharing Method for Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualFS: A New Journaling File System Without Meta-Data Duplication," Conference Proceedings of the 2002 International Conference on Supercomputing, New York, Jun. 22-26, 2002, p. 137-146.
Manber, U., and S. Wu, "GLIMPSE: A Tool to Search Through Entire File Systems," Proceedings of USENIX Winter 1994 Conference, San Francisco, Ca, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE—Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
NifRao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.
Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comisaphelp-ep50sp5/helpdata/en/la/9a4a3b80f2ec40aa7456bc87a94259/content.htm.
"Info Vision Infonnation Management System" http://66.1 02. 7.1 04/search?q=cachè:m IXV6K6sQOQJ :www.amlib.netlproducts/infovision.htm+customised+multi+property+file+navigation&hl=en.
"Previewing Files in the Common Dialog" http://www.elitevb.comlcontentiO 1,0084,0 II.
"TdcFolderListView component" http://www.appcontrols.comlmanualsIdiskcontrols/index.htm1?tdcfolderlistview.htm.
"Previewing Files" http://developer.apple.comIdocumentation/QuickTimeINMAC/QT/iqMovieToolbox.1a.htm.
"Text File Previewer 2.0 Beta" http://www.freedownloadscenter.comlUtilitiesIText-ViewerslText-File ]reviewer.html.
"Your Next OS: Windows 2006?" http://www.pcworld.comlnewsiarticle/O,aid,II3'63I.OO.asp.
"GetOpenFileName Function," downloaded from <http://msdn.microsoft.com>; date of first publication prior to Mar. 28, 2005; 2 pages.
"GetSaveFileName Function," downloaded from <http://msdn.microsoft.com>; date of first publication prior to Mar. 28, 2005; 2 pages.
"Using Common Dialog Boxes," downloaded from <http://msdn.microsoft.com>; date of first publication prior to Mar. 28, 2005; 8 pages.
"How to Use a Common Dialog File Open Dialog with Win32 API," downloaded from <http://support.microsoft.com>; date of first publication prior to Mar. 28, 2005; 3 pp.
"Creating an Enhanced Metafile," downloaded from <http://msdn.microsoft.com>; date of first publication prior to Mar. 28. 2005; 2 pages.
"Common Dialog Box Library," downloaded from <http://msdn.microsoft.com>: date of first publication prior to Mar. 28, 2005; 8 pages.
"OPENFILENAME Structure," downloaded from <http://msdn.microsoft.com>; date of first publication prior to Mar. 28, 2005; 7 pages.
"Open and Save as Dialog Boxes," downloaded from <http://msdn.microsoft.com>; date of first publication prior to Mar. 29, 2005; 9 pages.
"Customizing common dialog boxes," downloaded from http://msdn.microsoft.com; date for first publication prior to Apr. 20, 2005, 4 pages.
G.D. Venolia, et al., Supporting Email Workflow. Microsoft Research Technical Report MSR-TR-2001-88. Revised Dec. 2001 (Original Sep. 2001). Microsoft Corporation, Redmond, WA.
G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).
Microsoft Digital Image Suite User's Manual, Version 9.0. pp. 105-118, Available: http://www.microsoft.com/products/imaging/guides/SuiteManual.pdf, Apr. 30, 2004.
"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
International Search Report and Written Opinion of PCT/US04/25931 dated Apr. 3, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular,
http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Our", Microsoft Press, 2001, Chapter 11, 39 pages.
Bott, et al., Book titled "Special Edition Using Windows 98, Second Edition", Dec. 21, 1999, second edition, pp. 1-7.
Supplementary European Search Report for EP 04780390 dated Jun. 18, 2007.
Mozilla.org, "Mozilla Firebird's Features", Dec. 4, 2003, http://web.archive.org/web/20031204193628/http://wishlist.mozdev.org/firebirdfeatures.html, Section—Find as you Type.
Ministry of Economic Development, Intellectual Property Office of New Zealand, "Examination Report", May 17, 2007, New Zealand.
Kenji Domoto et al., "The Power of Fast Full Text Search," Nikkei Byte, No. 156, pp. 142-167, Nikkei Business Publications, Inc., Japan, Sep. 22, 1996 (Previously delivered.) Reference Literature: Cited Reference 2 in Final Notice of Rejection (Japan).
Yuji Tanaka, "Utilization Report, Introduction of "Convenient Techniques" Which Are Unexpectedly Unknown, Advanced Techniques for "Compression and Decompression," "Nikkei PC 21, vol. 7, No. 21, pp. 100-105, Nikkei Business Publications, Inc., Japan, Nov. 1, 2002, Cited Reference 3 in Final Notice of Rejection (Japan).
Hhideya Takane, et al., "Control of Access to Folders and Files," Windows NT World, vol. 5, No. 5, pp. 160-165, IDG Japan, Inc., Japan, May 1, 2000, Cited Reference 4 in Final Notice of Rejection (Japan).
Makoto Nishimasa, "Easily Creating a Network by Using Standard Features, Home Network Easily Realized Using Windows 2000, "Windows 2000 World, vol. 6, No. 2, pp. 126-133, IDG Japan, Inc., Japan, Feb. 1, 2001, Cited Reference 5 in Final Notice of Rejection (Japan).
"How Easy! Introduction to 'Storage Idea," NIKKEI PC 21, vol. 6, No. 1, pp. 46-53, Nikkei Business Publications, Inc., Japan, Jan. 1, 2001.
Andy Rathbone, Windows XP for Dummies, 2001, Wiley Publishing, Inc., pp. 145, 203, 204.
Esposito, D., "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?,first date of publication unknown but no later than Jun. 2000, 15 pages.
Grosky, et al., "Using Metadata for Intelligent Browsing of Structured Media Objects", Dec. 1994, Sigmond Record, vol. 23, No. 4, pp. 49-56.
Microsoft Windows XP Professional, 1985-2001.
Mozilla.org, "Mozilla Firebird's Features", Dec. 4, 2003, Section—Find as you Type.
Netscape Corporation, "Mozilla.org Find As You Type," Sep. 12, 2003, pp. 1-4.
Olivie, et al., "A Generic Metadata Query Tool", 1999, pp. 1-8—Dup of Verhoeven.
Pogue, David, "Windows XP Home Edition: The Missing Manual", O'Reilly, 2001.
Verhoeven et al., A Generic Metadata Tool, 10-19999, pp. 1-8.
Kumiko Sekiguchi, "Visual Basic Q&A," msdn magazine 2001, No. 16, pp. 97-103, ASCII Inc., Japan, Jul. 18, 2001.
Luiz F. Capretz et al., "Component-Based Software Development," IECON'01: The 27th Annual Conference of the IEEE Industrial Electronics Society, IEEE, Nov. 2001, pp. 1834-1837.
Mark Russionovich, "Internal Structure of NTFS4.0-Second Volume," NIKKEI Windows 2000, No. 53. pp. 176-182, Nikkei Business Publications, Inc., Japan, Aug. 1, 2001.
McFedries, Paul, "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Michael Halvorson and Michael Young, Microsoft Office XP, Processional Official Manual, 1st Ed., Nikkei BP Soft Press, Jul. 23, 2001, pp. 78-80.

Microsoft Press, Windows 98 Step by Step, Microsoft Corporation, p. 63, 1998.

Microsoft Windows XP Verison 2002 Screen Dumps.

Microsoft, Windows XP Professional, Screen Shots 1-8, copyright (1985-2001).

Revelle, A Visual Search Tool for Early Elementary Science Students, Mar. 2002, Journal of Science Education and Technology, vol. 11, pp. 49-57.

Sugasawa, "When and What of Pictures Become Clear! How to Readily Organize Images from Digital Cameras," Nikkei PC Beginers, vol. 2, pp. 78-95, vol. *, No. 4, Nikkei Business Publications, Inc., Japan.

Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.

Windows Commander, <http://web.archive.org/web.archive.org/web/20021017022627/www.ghisler.com/addons.htm> and <http://web.archive.org/web/20021017022627/www.ghisler.com/addons.htm>, first date of publication unknown but, prior to Feb. 19, 2003, 30 pages—Possibly This Is Only 4 PP.

Netscape Corporation, "Mozilla.org Find As You Type," Sep. 12, 2003, pp. 1-4, URL:http://web.archive.org/web/20031001234946/www.mozilla.org/projects/ui/accessibility/typeaheadfind.html>.

European Patent Office, "Supplemental European Search Report," Nov. 20, 2007, one page.

* cited by examiner

SYSTEM AND METHOD FOR DYNAMICALLY GENERATING A SELECTABLE SEARCH EXTENSION

CROSS-REFERENCE TO RELATED APPLICATIONS

The subject matter of this application is related to the subject matter of U.S. Provisional Patent Application Ser. No. 60/566,947 filed May 3, 2004 entitled "System and Method for Dynamically Generating a Selectable Search Extension", which application is assigned or under obligation of assignment to the same entity as this application, from which application priority is claimed, and which application is incorporated by reference herein; and to the subject matter of U.S. patent application Ser. No. 10/440,035 entitled "System and Method for Filtering and Organizing Items Based on Common Elements" filed May 16, 2003, which is in turn a continuation-in-part of U.S. patent application Ser. No. 10/403,341 entitled "System and Method for Filtering and Organizing Items Based on Common Elements" filed Mar. 27, 2003, each of which applications is assigned or under obligation of assignment to the same entity as this application, and each of which applications is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform for automatically generating a selectable search as a user inputs search terms, for instance matching file attributes or content to files in a file system, which search may be presented in word-wheel style and expand the level of directories or other point or level in file hierarchies in which the search may be performed.

BACKGROUND OF THE INVENTION

In the realm of operating system, application design and other fields, the need for a powerful and flexible search facility to search a user's storage frequently arises. A user may wish, for example, to search his or her hard drive to locate all files of a certain type or extension, such as ".doc", ".jpg", ".memo", ".report" or others to pull up documents to edit, print other manipulate in other ways. A user may likewise wish to search for files based on associated metadata, such as file size, or date created or modified. A user may at times also choose to search for files based on internal file content, such as desired text or numbers. The need to efficiently initiate and carry out these searches becomes particularly acute when the user is attempting to look through a large quantity of files or data. That situation may apply for example when a user is examining a national customer list in a CRM package, or updating contacts files or shared documents within a large corporation or other organization. In other cases, a user may wish to sort or search through a collection or catalogue of musical, video or other media or file material. Some search tools and facilities have evolved in response to large-scale file search and other requirements.

For example, some applications and other packages may present the user with an input box type of search interface, where the user may enter search terms such as file extensions or other attributes, or in-file characters or text. As the search, for example through a local hard drive and associated file system, progresses, files which partly or fully match the entered attributes or text may be displayed to the user to select or manipulate.

However, existing search tools may be constrained by certain limitations in usability or functionality. For instance, even such search tools as exist merely present the results gathered from searching the client or other file system at the current level or point in the file system hierarchy. So if no results are found in a given directory or folder, the user may be required to restart and reenter another search in another directory or folder, even when using the same search terms. Likewise, existing search tools do not permit the concurrent execution of searches on both file attributes (extension, name etc.) as well as deep or internal file searching, for instance to match text strings. Other problems in file management and search technology exist.

SUMMARY OF THE INVENTION

The invention overcoming these and other problems in the art relates in one regard to a system and method for dynamically generating a selectable search extension, in which a user may initiate a search through a file system based on file attributes or content at a current level or point in a file system hierarchy. In embodiments, the inventive platform may automatically generate on-the-fly results reflecting matches with files within the current level or point of the file system hierarchy. For example the platform may display a running total of files whose name, date, size, author or other attributes or textual or other content match the input search term or terms as the user enters those terms. According to embodiments of the invention in another regard, when the immediate results to the user's input search terms displays no or too few matches to any files in the current level or point in the file system hierarchy, or based on other conditions, a selectable search box may be automatically generated and presented. In embodiments the search box may dynamically suggest autocomplete strings for suggested or candidate search terms. The selectable search box may in embodiments be presented to the user in highlighted form, and permit the user to extend the search using the same search input or criteria to other levels by clicking or otherwise selecting a different level or point in the file system hierarchy, which may be highlighted or presented in a menu interface for quick activation.

DETAILED DESCRIPTION OF EMBODIMENTS

Figure 1:
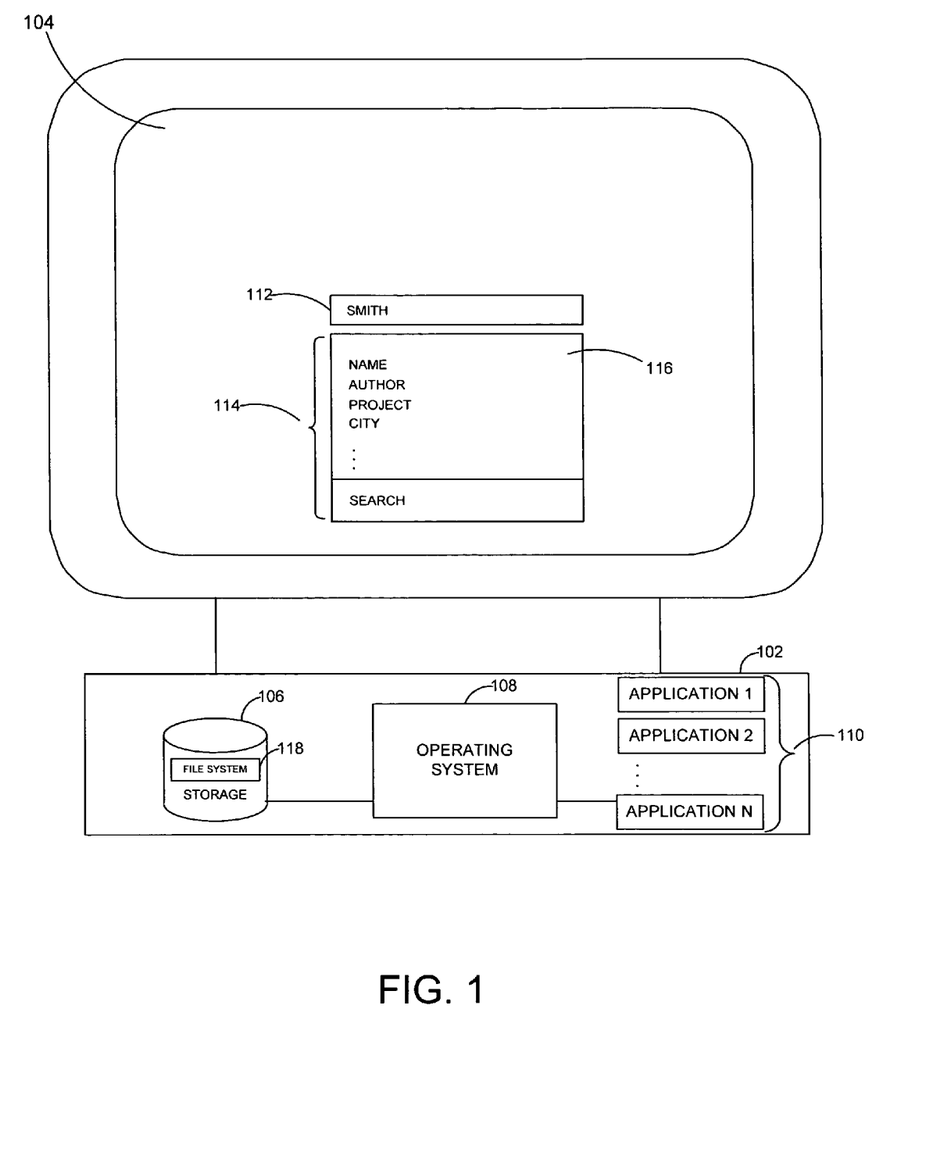
FIG. 1 illustrates a platform in which a system and method for dynamically generating a selectable search based on input search terms may operate, according to embodiments of the invention.

FIG. 1 illustrates an architecture in which a system and method for may operate, according to an embodiment of the invention. As illustrated in that figure, a user may use a manipulate a user interface 104 on a client 102 under control of an operating system 108, for instance to operate one or more applications in a set of applications 110 and perform other tasks. Client 102 may include storage 106 such as a hard drive, optical drives such as a CD-ROM or DVD-ROM, electronic media or other media or storage. In embodiments, the storage 106 may include a file system 118, which system may physically or logically encode programs and data stored on storage 106, such as for example in a directory, file, library, tree or other hierarchical or other structure. According to embodiments of the invention, the file system 118 may be or include the Windows™ File System (WFS) incorporated in succeeding generations of the Microsoft Windows™ family of operating systems. Other file systems, operating systems and related resources may be used.

During operation and use of client 102, the user may access storage 106 and file system 118 to perform such tasks as locating, opening, modifying and saving files and other objects. The tasks the user may engage may include searching for one or more files or other objects, for instance to open those files using one or more application in the set of applications 110, to enumerate a set of local files, for example to generate a total count of numbers of files of certain type, to locate and delete obsolete files, or other purposes or tasks. According to embodiments of the invention in one regard, the user may manipulate the user interface 104 to initiate and perform file searching tasks, for instance using one or more facilities, file types, objects or other features incorporated in or supported by operating system 108.

In embodiments as shown, the user may accordingly activate a search term input box 112, for instance by making a file menu selection within one or more screens in operating system 108, such as those screens or views generated by clicking or activating "MyComputer" or other icons, sidebars, menus or other resources. The user may respond to the search term input box 112 by entering one or more search terms related to a file or files of interest. For example, the user may wish to view all files with desired attributes, such as files having a ".doc", ".memo", ".report", ".txt", ".jpg" or other extension, or which were authored by a given user or on a certain date. Other extensions or attributes are possible, such as the time, language, file size, or other attribute of one or more files within file system 118. A user may in another regard likewise search for files within file system 118 based on the internal text, character, numbers or other content of those files, and enter those search terms accordingly. Search terms, data structures and related resources may in embodiments be, include or interface to for example those described in the aforementioned U.S. patent application Ser. No. 10/440,035 and U.S. patent application Ser. No. 10/403,341, or other search schemes or mechanisms.

Figure 2:
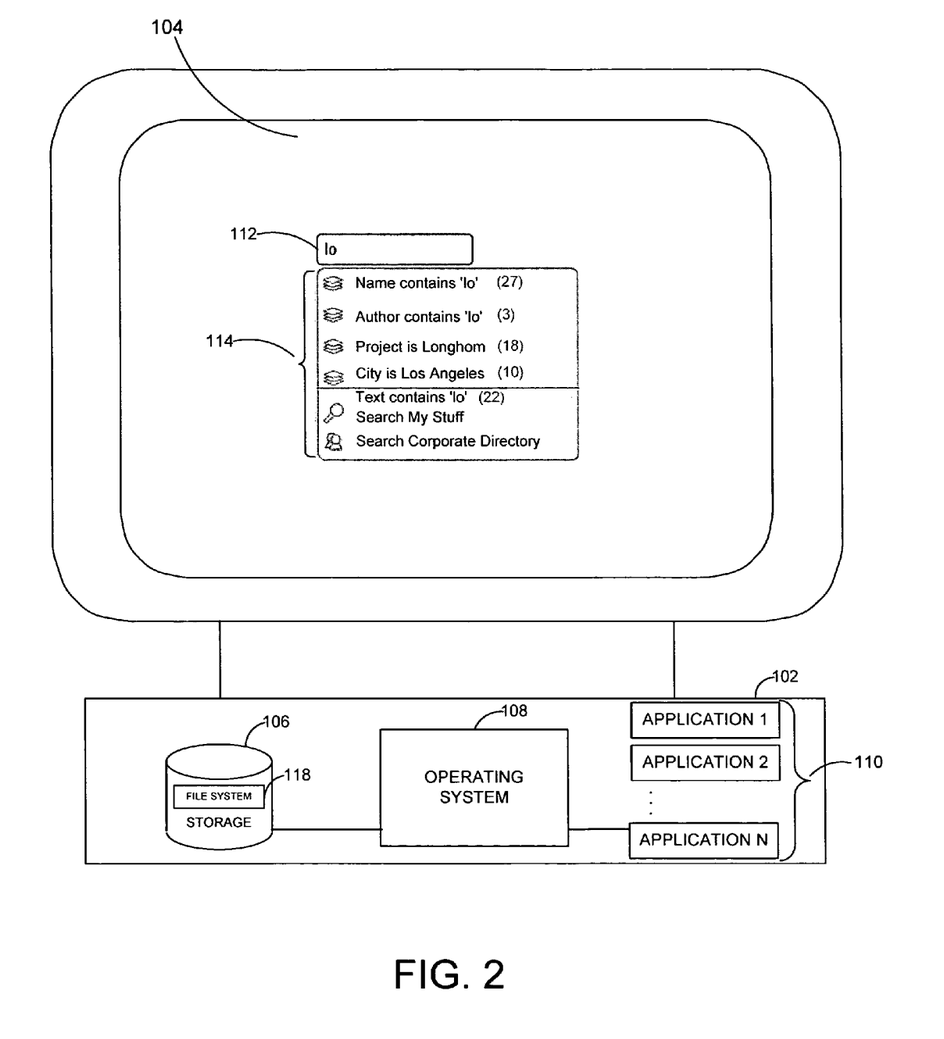
FIG. 2 illustrates a search facility or interface including an input search box, according to embodiments of the invention.

As illustrated in FIG. 2, according to embodiments of the invention in one regard, as the user begins to enter one or more search terms in the search term input box 112, the system may respond by automatically generating and presenting a search box 114. The search box 114 may reflect search activity and logic in response to the inputted search terms. According to embodiments as shown, the search box 114 may include, for example in an upper portion of a menu panel, a listing of a set of attributes for files which match the inputted search term or partial search term. According to embodiments, the listing of the set of attributes may be generated in an on-the-fly, immediate or real-time fashion so that as each new letter, character, number or other symbol in the search term is typed in or otherwise entered, the results may be immediately displayed.

In embodiments as shown, the on-the-fly results may include a parenthetical tally of the total number of files matching the inputted search term or partial search term, up to that moment in time. It may be noted that as illustrated in FIG. 2, when for example more than one property value matches the search string or term, the user may be presented with a menu entry indicating that the property "contains" the search string or term, such as "Name contains 'lo'" as shown. That is, in the illustrative example multiple names in the view may contain the string 'lo', e.g., "Logan", "Lorraine", "Lomar" or others. On the other hand, when there is only one unique property in the view which matches the search string or term, the user may be presented with a menu entry indicating that the property "is" the search string or term, such as "City is Los Angeles" as shown. Other interfaces and formats for displaying results are possible.

According to embodiments of the invention in one regard, the on-the-fly search results on file attributes may be generated from searching files displayed in the current list. In embodiments those files may be located in a single directory or location, or across multiple locations. As further illustrated in FIG. 2, while the on-the-fly search activity is taking place on file attributes, according to embodiments additional search activity may be initiated. More particularly, as illustrated the search box 114 may present in a lower menu section or otherwise a set of further search resources, in the exemplary case including one or more lines indicating internal (or deep) file searching which may take place concurrently or sequentially with the on-the-fly searching on file attributes. In the illustrative example, files at the current point or level of file system 118 may thus be examined for internal text ("lo") as that text is inputted by the user. Files containing that text string may be located and presented in the search box 114 as they are located. The speed with which the internally searched hits may be generated may vary according to the number of files in the current point or level in the file system 118, the input search terms, the type or existence of indexing on that file system or other factors.

Thus according to the invention in one regard, the user who initiates search activity may be presented with a multipart view on results in real-time as they are generated, including results of matching on file attributes (illustratively, the upper half of the search box 114) and on internal file content (bottom half), at the same time and without having to activate any additional options to do so.

Moreover, according to embodiments of the invention in further regards, as the results presented in the search box 114 unfold, the user may be presented with further automatic options to extend their search activity, to different points or levels of file system 118 or otherwise. In such cases and as more particularly illustrated in FIG. 3, according to embodiments of the invention the system may return the results of searching at a current level 120 of file system 118. Those results may accompanied by a presentation in search box 114 of automatically generated search extensions or options. In embodiments as shown, those extensions may include the highlighting of a different or modified level 122 or other point or location in file system 118 to which the same search terms inputted by the user may be applied, in an attempt to locate more or further matching files or other hits.

Figure 3:
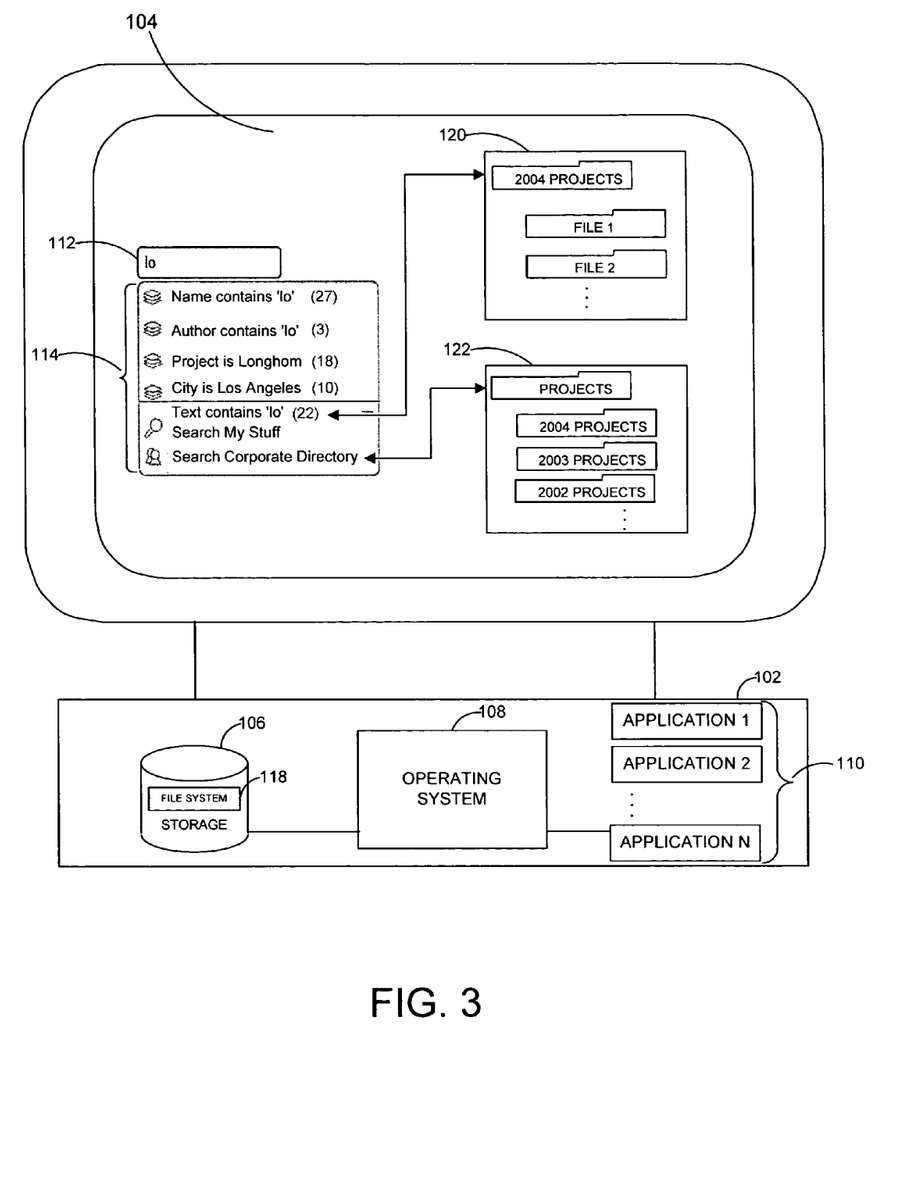
FIG. 3 illustrates a search facility or interface according to embodiments of the invention in another regard, including multi-level searching.

The user may for example highlight the modified level 122, such as a corporate directory or organizational contacts list, personal file folder or library, most-recently accessed file list, or other modified or different point or level in the file system 118 to activate that further searching in that location. The results of that continued or extended searching may likewise be presented in search box 114, or otherwise. The modified level 122 may be selected for example based on predetermined relational rules, such as moving one up or down one level in file system 118, by logical rules such as moving to directories with matching or related names or which stand in parent, child or other relationship to the current level 120, by defaults such as looking in a most-recently accessed files list, or by other rules or criteria.

The search options presented to the user may thus be automatically primed to look in further predetermined or logically related places in the file system 118, without a need for the user to manually change the directory or other hierarchical level they are viewing. In embodiments, the presentation of search extension options may be automatically presented, regardless of the amount or type of results at current level 120 of file system or other parameters. In other embodiments, the triggering of search extension options in search box 114 may be conditioned on defined criteria, such as when searching on attributes and content based on whole or partial search terms generates no matching results, or fewer hits than the user finds necessary. In embodiments the user may enter minimum thresholds or they may be set by default. Other triggering conditions are possible.

Figure 4:
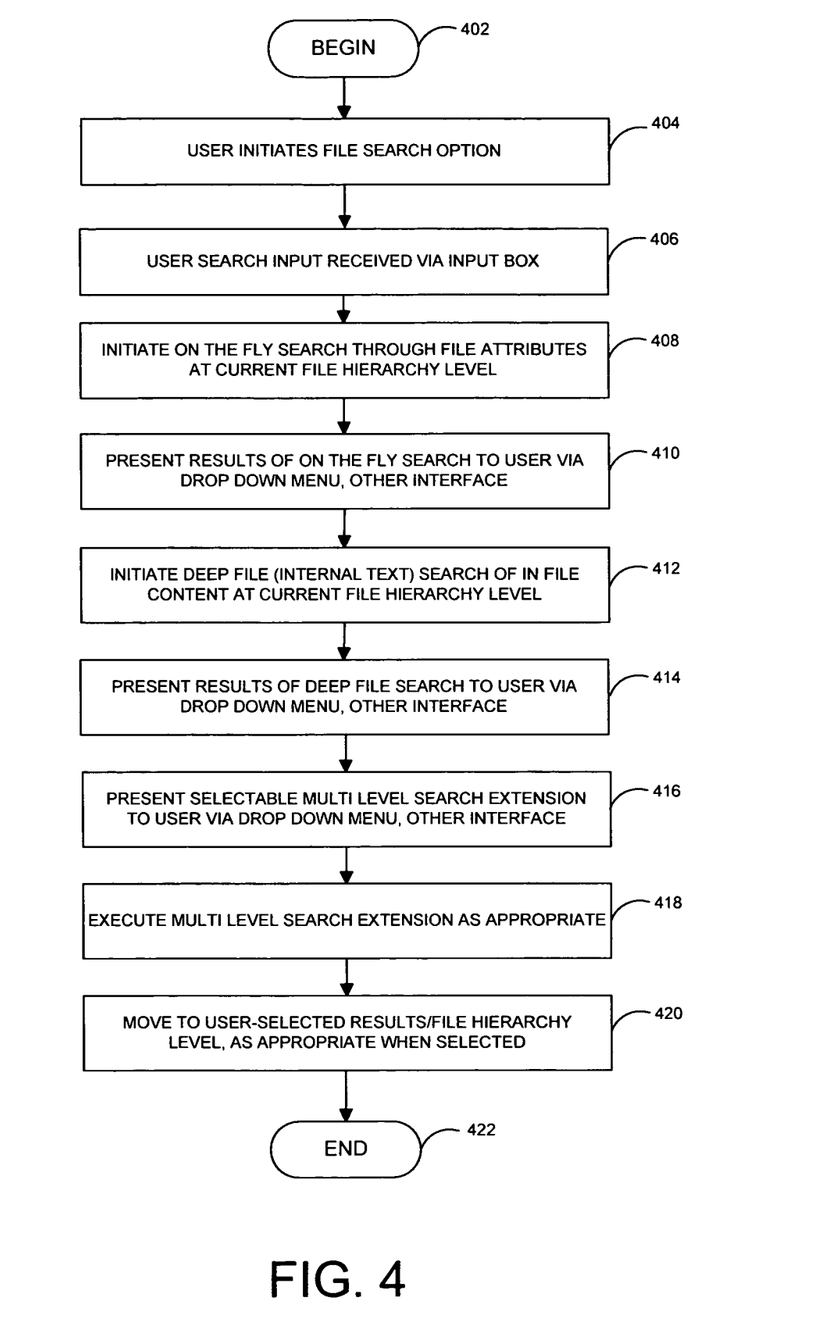
FIG. 4 illustrates a flowchart of overall search extension processing, according to embodiments of the invention.

FIG. 4 illustrates overall search and file management processing, according to embodiments of the invention. In step 402, processing may begin. In step 404, a user may initiate a file search option, for example by selecting a file management toolbar in an operating system, by selecting a file search facility in an application which in turn calls operating system resources, or by other menus or selections. In step 406, user input may be received via search term input box 112 or other interfaces, for example receiving typed search terms. In step 408, on-the-fly search activity may be initiated to search for file attributes at a current level in the file system 118, such as in a current directory, folder or other point or level in the file system hierarchy, based on the user input. For example all files with extension ".memo" or authored by "Smith" may be searched and sorted at the current point or level in the file system 118.

In step 410, the running results of the on-the-fly search on attributes at the current level in file system 118 may be presented to the user, for example via a search box 114, in word-wheel type fashion or otherwise. In step 412, a sequential or concurrent deep file search, for instance involving opening and searching files internally, or indices of files, for text or strings matching the user input, may be initiated at the current point or level in the file system 118, for example within a current directory or folder.

In step 414, results of the on-the-fly deep searching on internal file content may be presented to the user, for example via the search box 114, for instance separated from the real-time search results based on file attributes by a menu separator or line. In step 416, depending on the results of the on-the-fly attribute and/or deep file searching, the user may be presented with a selectable search extension box, to extend the search based on the currently inputted search terms to other points or levels in the hierarchy of file system 118.

In step 418, an extension of the search to a different point or level in the file system 118 may be initiated, for instance when the user activates a highlighted directory, file or other prompt in search box 114. In embodiments the same search terms which the user had inputted into the search term input box 112 may be pre-inserted into the highlighted portion of the search box 114, or otherwise. On-the-fly results may in embodiments be similarly presented via search box 114 as the multi-level extension to the search activity progresses.

In step 420, the view in search box 114 or other interface may be updated to display user-selected or highlighted files or other results, for example a clicked or highlighted file or set of files located in a different level of the file system 118. Files may be opened, sorted or otherwise manipulated when the view moves to the new point or level in the file system 118. Prior levels may be stored or displayed as shadowed directories, folders or other objects, in embodiments. In step 422, processing may repeat, return to a prior processing point, jump to a further processing point, or end.

The foregoing description of the invention is illustrative, and modifications in configuration and implementation will occur to persons skilled in the art. For instance, while the invention has generally been described in terms of a platform in which an interface displays a single search box or facility, in embodiments multiple search boxes or other interfaces, for example cascaded search boxes, may be generated as matches or partial matches are found.

Similarly, while the invention has in embodiments been generally described as executing searches on local hard disk or other storage, in embodiments the automatic searches may be performed on one or more local, remote or distributed storage or file systems, independently or in combinations. For example, a remote server disk may be searched, or a local hard disk may be searched in combination with a storage area network (SAN). Multiple local disks or other media may likewise be searched, serially or concurrently.

Other hardware, software or other resources described as singular may in embodiments be distributed, and similarly in embodiments resources described as distributed may be combined. Further, while the invention has generally been described as involving on-the-fly searches based on a single search term as that string or term is typed, in embodiments multiple or joint search terms may be accepted for searching, for instance using Boolean operations. The scope of the invention is accordingly intended to be limited only by the following claims.

We claim:

1. A method for automatically presenting a search interface facility on a display comprising:
receiving search parameters that include a search criteria and a file location to be searched;
determining that a first amount of files within the file location have file content that matches the search criteria, wherein the file content is the subject matter of a file;
determining that a plurality of attributes associated with one or more files in the file location have a file attribute value that matches the search criteria, wherein a file attribute is a characteristic of the file;
for each of the plurality of attributes, determining how many files in the file location contain an attribute value that matches the search criteria; and
displaying a search box having a first panel and a second panel, wherein the first panel displays each of the plurality of attributes with an indication adjacent to each of the plurality of attributes, wherein the indication communicates how many times an attribute displayed adjacent to the indication has an attribute value for a file in the file location that matches the search criteria, and wherein the second panel displays the first amount of files within the file location that have file content that matches the search criteria and at least one input button that activates an automatic option to change the search parameters.

2. The method of claim 1, wherein the method further comprises:
receiving new search parameters; and
dynamically updating the first panel and the second panel upon receiving the new search parameters.

3. The method of claim 2, wherein receiving the new search parameters includes designating a new hierarchical level in the file system.

4. The method of claim 2, wherein receiving the new search parameters that includes new search criteria.

5. The method of claim 1, wherein the indication is presented within parenthesis.

6. The method of claim 1, wherein the search results are received through a graphical user interface.

7. The method of claim 1, wherein the at least one automatic option to change the search parameters suggests a new search criteria.

8. The method of claim 7, wherein the method further comprises:
   determining that a second amount of files within the file location have file content that matches the new search criteria;
   determining that a new plurality of attributes associated with one or more files in the file location have a file attribute value that matches the new search criteria;
   for each of the new plurality of attributes, determining how many files in the file location contain an attribute value that matches the new search criteria; and
   displaying an updated search box having the first panel and the second panel, wherein the first panel displays each of the new plurality of attributes with an indication adjacent to each of the new plurality of attributes, wherein the indication communicates how many times an adjacent attribute has an attribute value for a file in the file location that matches the new search criteria, and wherein the second panel displays the second amount of files within the file location that have file content that matches the new search criteria and at least one automatic option to change the search parameters.

9. The method of claim 1, wherein the at least one automatic option to change the search parameters suggests a new file location.

10. The method of claim 9, wherein the method further includes:
    determining that a second amount of files within the new file location have file content that matches the search criteria;
    determining that a plurality of attributes associated with one or more files in the new file location have a file attribute value that matches the search criteria;
    for each of the plurality of attributes, determining how many files in the new file location contain an attribute value that matches the search criteria; and
    displaying a search box having the first panel and the second panel, wherein the first panel displays each of the plurality of attributes with an indication adjacent to each of the plurality of attributes, wherein the indication communicates how many times an adjacent attribute has an attribute value for a file in the new file location that matches the search criteria, and wherein the second panel displays the first amount of files within the new file location that have file content that matches the search criteria and at least one automatic option to change the search parameters.

11. The method of claim 1, where in the search box includes a third panel showing graphical representation of a folder hierarchy, and wherein the graphical representation may be dynamically selected by a user to change the file location.

12. A method of generating and displaying search results comprising:
    receiving a first input symbol;
    concurrently searching a set of files in a file system to generate a first plurality of files that have one or more file attribute values that match the first input symbol and a second plurality of files that have file content that matches the first input symbol;
    concurrently displaying a first interface that displays one or more file attributes that are associated with the one or more file attributes values from the first plurality of files and at least how many files in the second plurality of files are associated with each attribute that has an attribute value that matches the first input symbol and a second interface that displays how many files are in the second plurality of files;
    receiving a second input symbol;
    concurrently searching the set of files to update the first plurality of files to include files that have one or more file attribute values that match the first input symbol and the second input symbol and the second plurality of files to include the files that have file content that matches the first input symbol and the second input symbol; and
    updating the first interface based on the updated first plurality of files and a second interface based on the updated second plurality of files.

13. The method according to claim 12, wherein the receiving of the first and second input symbols comprises receiving the first and second input symbols via a graphical user interface.

14. The method of claim 12, wherein the method further comprises displaying a graphical representation of a folder hierarchy that is selectable by a user to designated the file system to be searched.

15. The method of claim 14, wherein the method further comprises receiving a selection of a new file system to search.

16. The method of claim 14, wherein the method further comprises updating the first plurality of files and the second plurality of files to include only files in the new file system.

17. One or more computer-storage media with computer-executable instructions embodied thereon, that when executed by a computing device performs a method for automatically presenting a search interface facility on a display, the method comprising:
    displaying an input interface to sequentially receive a first input symbol and a second input symbols;
    concurrently searching file content and file attribute values associated with a set of files in a file system;
    displaying an interface in response to receiving the first input symbol with a first panel showing first results based on results of matching the first input symbol to file attributes of files in the file system, wherein the first panel displays each of the file attributes with an indication adjacent to each of the file attributes, wherein the indication communicates how many times a file attribute displayed adjacent to the indication has an attribute value that matches the first input symbol;
    displaying a second panel on the interface with first results of matching the first input symbol to the content of the files in the file system; and
    displaying updated first and second panels in response to receiving the second input symbol based on second results produced by searching the first results of matching the first symbol to the file attributes of files in the file system and the first results of matching the first input symbol to the contents of the files in the file system, respectively, using a combination of the first and second input symbols, wherein the first and second panels are concurrently displayed and the updated first and second panels are concurrently displayed.

18. The computer-storage media of claim 17, wherein the input interface comprises a graphical user interface.

19. The media of claim 17, wherein the method further comprises receiving a selection of a new set of files system to search.

20. The media of claim 19, wherein the method further comprises updating the first plurality of files and the second plurality of files to include only files in the new set of files.

21. The media of claim 17, wherein the first panel displays each of the plurality of attributes with an indication adjacent to each of the plurality of attributes, wherein the indication communicates how many times an adjacent attribute has an attribute value for a file in the set of files that matches the first input symbol and the second input symbol.

22. The media of claim 21, wherein the second panel displays how many files in the set of files have content that matches the first input symbol and the second input symbol.

23. The media of claim 17, wherein the second panel displays how many files in the set of files have content that matches the first input symbol.

\* \* \* \* \*